United States Patent
Root et al.

(10) Patent No.: US 7,096,330 B1
(45) Date of Patent: Aug. 22, 2006

(54) SYMMETRICAL DATA CHANGE TRACKING

(75) Inventors: Michael E. Root, San Jose, CA (US); Gopal Sharma, San Jose, CA (US); Oleg Kiselev, Palo Alto, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 367 days.

(21) Appl. No.: 10/207,432

(22) Filed: Jul. 29, 2002

(51) Int. Cl.
*G06F 12/00* (2006.01)

(52) U.S. Cl. ..................... 711/162; 711/156

(58) Field of Classification Search ........... 711/112, 711/161, 162, 111, 114; 707/202, 204; 714/6, 714/15
See application file for complete search history.

(56) References Cited

U.S. PATENT DOCUMENTS

| | | | |
|---|---|---|---|
| 5,649,152 A | 7/1997 | Ohran et al. | 711/114 |
| 5,835,953 A | 11/1998 | Ohran | 711/162 |
| 5,875,479 A | 2/1999 | Blount et al. | 711/162 |
| 5,915,098 A | 6/1999 | Palmer et al. | 395/200.77 |
| 6,073,222 A | 6/2000 | Ohran | 711/162 |
| 6,085,298 A | 7/2000 | Ohran | 711/162 |
| RE37,601 E * | 3/2002 | Eastridge et al. | 714/6 |
| 6,728,898 B1 * | 4/2004 | Tremblay et al. | 714/6 |
| 6,732,245 B1 | 5/2004 | Kaiya et al. | 711/162 |
| 6,779,093 B1 * | 8/2004 | Gupta | 711/162 |
| 2003/0014433 A1 * | 1/2003 | Teloh et al. | 707/204 |
| 2003/0061366 A1 * | 3/2003 | Musante et al. | 709/230 |
| 2003/0126388 A1 * | 7/2003 | Yamagami | 711/162 |
| 2003/0158869 A1 | 8/2003 | Micka | 707/203 |

* cited by examiner

*Primary Examiner*—Hong Kim
*Assistant Examiner*—Shane M. Thomas
(74) *Attorney, Agent, or Firm*—Campbell Stephenson Ascolese LLP

(57) ABSTRACT

A method, computer program product, computer system and system that enable symmetrical data change tracking with respect to a set of data and a copy of the set of data, referred to as a snapshot or a second set of data. The data and the copy may be independently updated after the two sides are "split." A join may be performed of the two sides of the split to resynchronize the data.

For the first set of data, an accumulator map tracks changes to the first set of data and a volume map tracks changes to the first set of data with respect to a second set of data. For the second set of data (the snapshot), a second accumulator map tracks changes to the second set of data and a second volume map tracks changes to the second set of data with respect to the first set of data.

29 Claims, 10 Drawing Sheets

| Region 1 | Region 2 | Region 3 | Region 4 | Region 5 | Region 6 | Region 7 | Region 8 |
|---|---|---|---|---|---|---|---|
| B | Z | 3 | C | J | 5 | X | F |

Primary Data 210A at Time A

| Region 1 | Region 2 | Region 3 | Region 4 | Region 5 | Region 6 | Region 7 | Region 8 |
|---|---|---|---|---|---|---|---|
| B | 7 | 15 | C | J | 5 | A2 | F |

Primary Data 210B at Time B

| Change Bit for Region 1 | Change Bit for Region 2 | Change Bit for Region 3 | Change Bit for Region 4 | Change Bit for Region 5 | Change Bit for Region 6 | Change Bit for Region 7 | Change Bit for Region 8 |
|---|---|---|---|---|---|---|---|
| 0 | 1 | 1 | 0 | 0 | 0 | 1 | 0 |

Data Change Map 220 at Time B

FIG. 2

| | Event | Primary Volume | Accum Map | SS1 Vol Map | SS2 Vol Map | SS3 Vol Map |
|---|---|---|---|---|---|---|
| 5.1 | Begin | | 00 00 00 00 | | | |
| 5.2 | Write A To R2 | _ _ A _ _ _ _ _ | 01 00 00 00 | | | |
| 5.3 | Write B To R5 | _ _ A _ _ B _ _ | 01 00 10 00 | | | |
| 5.4 | Create SS1 | | | | | |
| 5.5 | Update Active Volume Maps (None Exist) | | | | | |
| 5.6 | Clear Accumulator | | 00 00 00 00 | | | |
| 5.7 | Create SS1 Vol Map | _ _ A _ _ B _ _ | | 00 00 00 00 | | |
| 5.8 | Write C To R4 | _ _ A _ CB _ _ _ | 00 01 00 00 | | | |
| 5.9 | Write D To R8 | _ _ A _ CB _ D _ | 00 01 00 01 | | | |
| 5.10 | Create SS2 | | | | | |
| 5.11 | Update Active Volume Maps | | | 00 01 00 01 | | |
| 5.12 | Clear Accumulator | | 00 00 00 00 | | | |
| 5.13 | Create SS2 VolMap | | | | 00 00 00 00 | |
| 5.14 | Write E To R7 | _ _ A _ CB _ ED _ | 00 00 00 10 | | | |
| 5.15 | Write F To R3 | _ AFCB _ ED _ | 00 10 00 10 | | | |

| | Event | Volume 1 | Vol1 Acc Map | Vol1 Volume Map (wrt Vol2) | Volume 2 | Vol2 Acc Map | Vol2 Volume Map (wrt Vol1) |
|---|---|---|---|---|---|---|---|
| 6.1 | Begin | | 00 00 00 00 | | | | |
| 6.2 | Write A To Vol1 R2 | A | 01 00 00 00 | | | | |
| 6.3 | Write B To Vol1 R5 | A B | 01 00 10 00 | | | | |
| 6.4 | Create SS of Vol1 Vol2=SSVol1 Vol1=SSVol2 | | | | A B | 00 00 00 00 | |
| 6.5 | Update Vol1 VolMaps | | | | | | |
| 6.6 | Clear Vol1 Accumulator | | 00 00 00 00 | | | | |
| 6.7 | Create Vol1 Volume Map wrt Vol2 | | | 00 00 00 00 | | | |
| 6.8 | Write C To Vol2 R4 | | | | A C B | 00 01 00 00 | |
| 6.9 | Write D To Vol2 R8 | | | | A C B D | 00 01 00 01 | |
| 6.10 | Create SS of Vol2 | | | | | | 00 00 00 00 |
| 6.11 | Update Vol2 Vol Maps | | | | | | 00 01 00 01 |
| 6.12 | Clear Vol2 Accumulator | | | | | 00 00 00 00 | |
| 6.13 | Write E To Vol1 R7 | A B E | 00 00 00 10 | | | | |
| 6.14 | Create 2nd SS of Vol1 | | | 00 00 00 10 | | | |
| 6.15 | Update Vol1 Vol Maps | | | | | | |
| 6.16 | Clear Vol1 Accum | | 00 00 00 00 | | | | |

| 610 | Event | 620 Volume 1 | | | | 650 Volume 2 | | | | 680 Combined Map | | | |
|---|---|---|---|---|---|---|---|---|---|---|---|---|---|
| 6.16 | (Before Sync) | _A | B_ | E_ | | _A | _C | B_ | D | | | | |
| 6.17 | Synchronize Volume 2 to Volume 1 | _A | B_ | E_ | | _A | | B_ | E_ | 00 | 01 | 00 | 11 |

FIG. 6B

| 610 | Event | 620 Volume 1 | | | | 650 Volume 2 | | | | 680 Combined Map | | | |
|---|---|---|---|---|---|---|---|---|---|---|---|---|---|
| 6.16 | (Before Sync) | _A | B_ | E_ | | _A | _C | B_ | D | | | | |
| 6.17 | Synchronize Volume 1 to Volume 2 | _A | _C | B_ | D | _A | _C | B_ | D | 00 | 01 | 00 | 11 |

FIG. 6C

SYMMETRICAL DATA CHANGE TRACKING

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

CROSS-REFERENCE TO RELATED APPLICATIONS

This application relates to application Ser. No. 10/207,451, filed on same day herewith, entitled "Maintaining Persistent Data Change Maps for Fast Data Synchronization and Restoration" and naming Michael E. Root, Anand A. Kekre, Arun M. Rokade, John A. Colgrove, Ronald S. Karr and Oleg Kiselev as inventors, the application being incorporated herein by reference in its entirety.

BACKGROUND OF THE INVENTION

Information drives business. A disaster affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from disasters. Often these measures include protecting primary, or production, data, which is 'live' data used for operation of the business. Copies of primary data on different physical storage devices, and often at remote locations, are made to ensure that a version of the primary data is consistently and continuously available. Typical uses of copies of primary data include backup, Decision Support Systems (DSS) data extraction and reports, testing, and trial failover (i.e., testing failure of hardware or software and resuming operations of the hardware or software on a second set of hardware or software). These copies of data are preferably updated as often as possible so that the copies can be used in the event that primary data are corrupted, lost, or otherwise need to be restored.

Two areas of concern when a hardware or software failure occurs, as well as during the subsequent recovery, are preventing data loss and maintaining data consistency between primary and backup data storage areas. One simple strategy includes backing up data onto a storage medium such as a tape, with copies stored in an offsite vault. Duplicate copies of backup tapes may be stored onsite and offsite. However, recovering data from backup tapes requires sequentially reading the tapes. Recovering large amounts of data can take weeks or even months, which can be unacceptable in today's 24×7 business environment.

More robust, but more complex, solutions include mirroring data from a primary data storage area to a backup, or "mirror," storage area in real-time as updates are made to the primary data. FIG. 1A provides an example of a storage environment 100 in which data 110 are mirrored. Computer system 102 processes instructions or transactions to perform updates, such as update 104A, to data 110 residing on data storage area 112.

A data storage area may take form as one or more physical devices, such as one or more dynamic or static random access storage devices, one or more magnetic or optical data storage disks, or one or more other types of storage devices. With respect to backup copies of primary data, preferably the storage devices of a volume are direct access storage devices such as disks rather than sequential access storage devices such as tapes.

In FIG. 1A, two mirrors of data 110 are maintained, and corresponding updates are made to mirrors 120A and 120B when an update, such as update 104A, is made to data 110. For example, update 104B is made to mirror 120A residing on mirror data storage area 122, and corresponding update 104C is made to mirror 120B residing on mirror data storage area 124 when update 104A is made to data 110. As mentioned earlier, each mirror should reside on a separate physical storage device from the data for which the mirror serves as a backup, and therefore, data storage areas 112, 122, and 124 correspond to three physical storage devices in this example.

A snapshot of data can be made by "detaching" a mirror of the data so that the mirror is no longer being updated. FIG. 1B shows storage environment 100 after detaching mirror 120B. Detached mirror 120B serves as a snapshot of data 110 as it appeared at the point in time that mirror 120B was detached. When another update 106A is made to data 110, a corresponding update 106B is made to mirror 120A. However, no update is made to detached mirror 120B.

Saving backup copies or snapshots on mirrored direct access storage devices, rather than on sequential access storage devices, helps to speed synchronization of a snapshot with the data from which the snapshot was made. However, copying all data from snapshots can be unacceptably time-consuming when dealing with very large volumes of data, such as terabytes of data. A faster way to restore and/or synchronize large volumes of data is needed.

One solution to the problem of restoring data from a snapshot is to save the changes made to the data after the snapshot was taken. Those changes can then be applied in either direction. For example, the changes can be applied to the snapshot when there is a need for the snapshot to reflect the current state of the data. For example, referring back to FIG. 1B, after update 106A is made to data 110, detached mirror (snapshot) 120B is no longer "synchronized" with data 110. To be synchronized with data 110, detached mirror (snapshot) 120B can be updated by applying the change made in update 106A.

Alternatively, to return to a previous state of the data before update 106A was made, the changed portion of data 110 can be restored from (copied from) detached mirror (snapshot) 120B. The change made in update 106A is thereby "backed out" without copying all of the data from the snapshot.

Saving the actual changes made to very large volumes of data can be problematic, however, introducing additional storage requirements. To save physical disk space, changes can be stored in temporary data storage areas such as volatile memory, but those changes are vulnerable to computer system, hardware, and software failures. In addition, storing the changes in temporary data storage areas typically requires that the snapshot and the data are stored in a common physical storage area that can be accessed by a common volatile memory. A requirement that the snapshot and the data be stored in a common physical data storage area can limit the number of snapshots that can be made of the data in organizations having limited resources or a very large amount of data. Furthermore, many applications suffer severe performance problems when more than one snapshot of a set of data is made due to the overhead involved in writing the data to multiple places.

What is needed is the ability to quickly synchronize a snapshot with data from which the snapshot was taken to provide continuous access to critical data. Preferably, the solution should enable data to be synchronized with a snapshot of the data without copying all of the data. Preferably, the snapshot data and the original data are independently updatable after the snapshot is taken. The solution should have minimal impact on performance of applications using the data having one or more snapshots. In addition, preferably the solution enables snapshot data to be located separately and independently of the location of the primary data.

SUMMARY OF THE INVENTION

The present invention provides a method, system, computer system and computer program product to enable symmetrical data change tracking with respect to a set of data and a copy of the set of data, referred to as a snapshot or a second set of data. The data and the copy may be independently updated after the two sides are "split." A join may be performed of the two sides of the split to resynchronize the data.

For the first set of data, an accumulator map tracks changes to the first set of data and a volume map tracks changes to the first set of data with respect to a second set of data. For the second set of data (the snapshot), a second accumulator map tracks changes to the second set of data and a second volume map tracks changes to the second set of data with respect to the first set of data.

BRIEF DESCRIPTION OF THE DRAWINGS

The present invention may be better understood, and its numerous objects, features and advantages made apparent to those skilled in the art by referencing the accompanying drawings.

FIG. 2 shows primary data and a persistent data change map for tracking changes to the primary data.

FIGS. 5A and 5B, collectively referred to as FIG. 5, show events related to primary data in a primary volume, a persistent accumulator map for tracking changes to the primary data, and three persistent volume maps for tracking data changes with respect to three snapshots of the primary data taken at different points in time.

FIGS. 6A, 6B and 6C illustrate the use of symmetrical data change tracking with respect to a set of data and a snapshot of the set of data in accordance with one embodiment of the present invention.

The use of the same reference symbols in different drawings indicates similar or identical items.

DETAILED DESCRIPTION

Figure 1A:
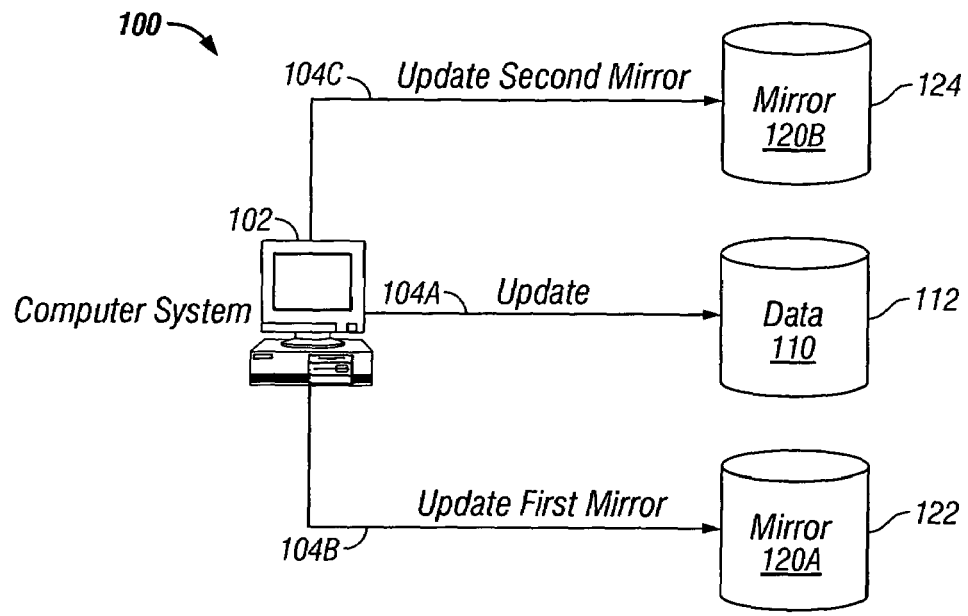
FIGS. 1A and 1B provide an example of a storage environment in which data mirroring is used, as described above.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are escribed which may be requirements for some embodiments but not other embodiments.

Introduction

The present invention provides a method, system, and computer program product to synchronize data and a snapshot of the data taken at a given point in time. Synchronization of the snapshot with the data can be performed upon hardware or software failure or upon a subsequent snapshot operation. Only changes to the data made after the snapshot was taken are applied to synchronize the snapshot with the data so that all of the data is not copied. The changes are stored persistently to survive system, hardware and software failures.

Snapshots can be located in a physically separate location from the data itself, and, in one embodiment, snapshots can be updated independently after they are taken. For example, it is desirable to perform testing and write changes to a copy of 'live' data before a new version of software manipulating the data is installed. However, it may be necessary to use the snapshot to restore data, and it is desirable to be capable of "backing out" changes to the snapshot and restoring the data to its state at the point the snapshot was taken. Synchronization can therefore be performed in either direction.

For example, restoration can be performed when a decision is made to "back out" a set of changes made to the primary data. Any changes made to the snapshot data after the snapshot was taken are also "backed out" to restore the primary data to the point in time when the snapshot was made.

One way to reduce storage requirements for tracking changes is to use bitmaps, also referred to herein as maps, with the data divided into regions and each bit in the bitmap corresponding to a particular region of the data. Each bit is set to logical 1 (one) if a change to the data in the respective region has been made. If the data have not changed, the respective bit is set to logical 0 (zero).

FIG. 2 shows an example of primary data at two points in time, where primary data 210A represents the primary data as it appeared at time A and primary data 210B represents the primary data as it appeared at time B (time B being later than time A). Also shown is a corresponding data change map 220 at time B showing eight regions of the primary data for explanation purposes. As shown in data change map 220, the primary data in regions 2, 3, and 7 changed between times A and B. As mentioned above, data change maps have not traditionally been stored persistently and have been subject to loss upon system, hardware, and/or software failures. The present invention stores data change maps persistently in order to retain tracking of changes despite system and/or cluster failures.

One type of data change map used in the present invention is referred to an accumulator map. The format of an accumulator map corresponds to the format of data change map 220 shown in FIG. 2. An accumulator map tracks changes made to a set of data. When an update to the data is made, a bit is set to logical 1 in the persistent accumulator map. Therefore, one accumulator map is updated for each update of data, rather than updating multiple maps for each change to data, adding minimal overhead to each write operation.

An accumulator map can be used to update other data change maps, for example, when a new snapshot of the respective data is created. An example of another type of data change map used in the present invention is a volume map. A volume map tracks changes made to data with respect to a second set of data, such as a given snapshot of the data. In one embodiment of the present invention, a persistent volume map is maintained for each snapshot created. Preferably, persistent maps associated with a particular set of data are stored along with the set of data to speed the synchronization process.

Figure 1B:
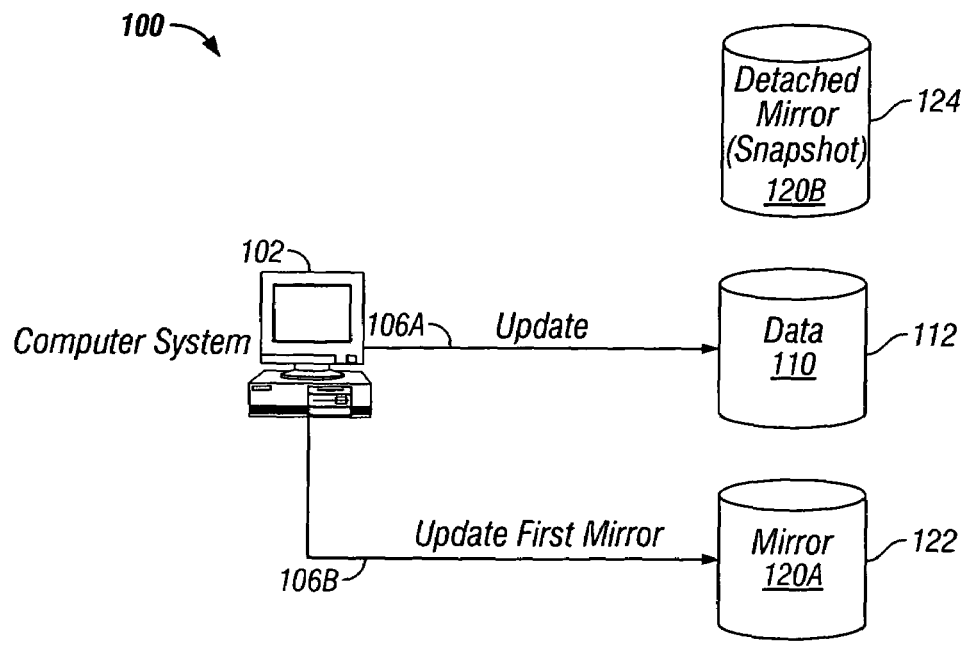
Figure 3:
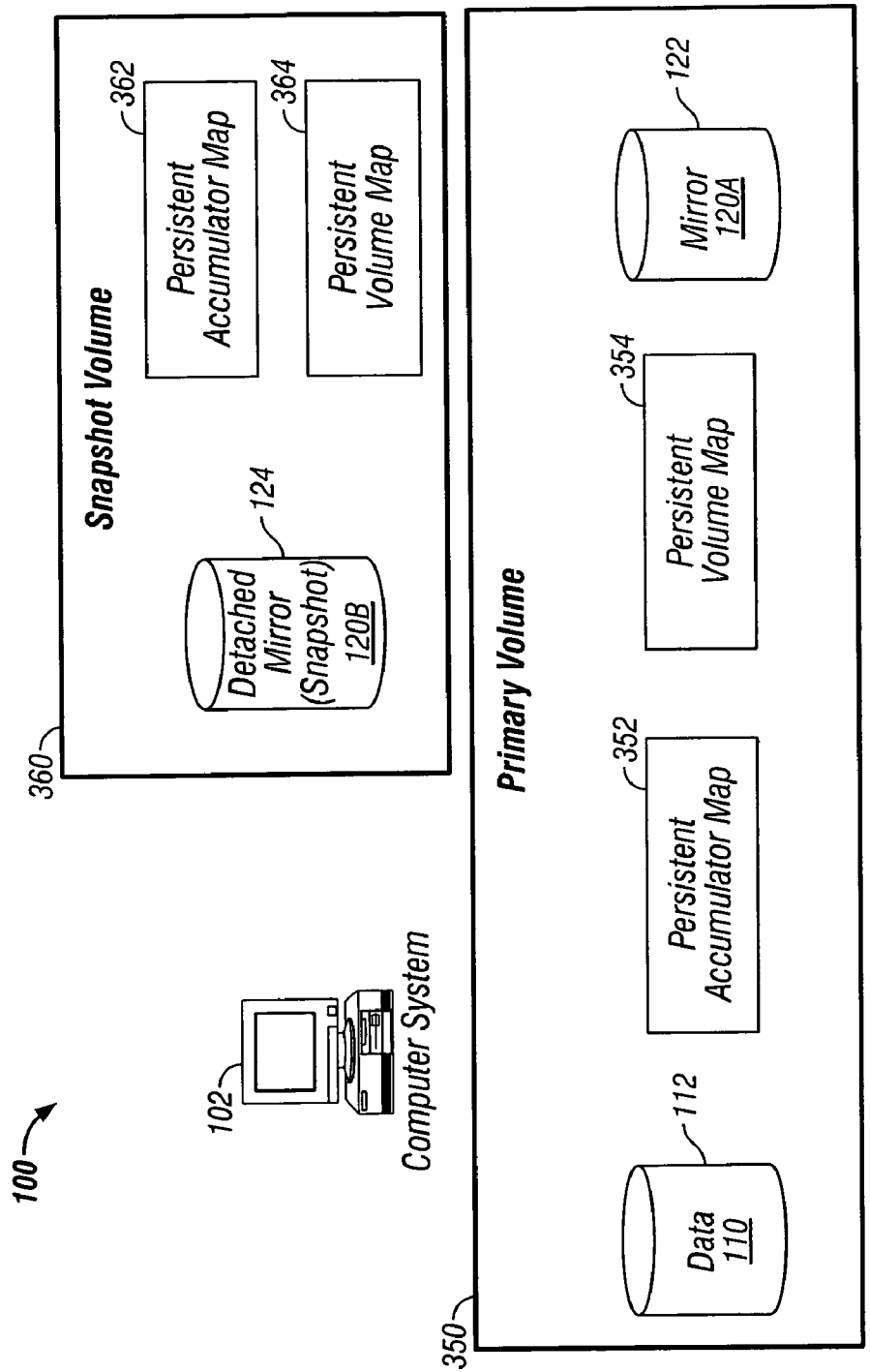
FIG. 3 provides an example of the storage environment of FIGS. 1A and 1B including persistent data change maps in accordance with the present invention.

FIG. 3 is an example of the storage environment 100 of FIGS. 1A and 1B configured to use persistent data change maps in accordance with the present invention. The data storage areas are configured into data volumes. As the term is used herein, a "data volume" contains one logical set of data and one or more mirrors of the set of data. The term "volume" is not limited to a particular type of storage technology. Normally, a data volume logically includes multiple physical storage devices. A data volume can also include persistent data change maps, such as a persistent accumulator map and one or more persistent volume maps for persistently tracking changes made to the data with respect to one or more snapshots of the data. A storage device such as a RAID array, which includes multiple storage disks, can be considered to include multiple data volumes.

In FIG. 3, data storage area 112 and mirror data storage area 122 are logically included in a single data volume called primary volume 350. Primary volume 350 also includes persistent accumulator map 352 and persistent volume map 355. Persistent primary accumulator 352 tracks changes made to data 110, and persistent volume map 354 tracks changes made to data 110 with respect to another copy of data 110. In this case, changes to data 110 are tracked with respect to detached mirror (snapshot) 120B.

Detached mirror (snapshot) 120B is logically included in snapshot volume 360. One advantage of the configuration shown in FIG. 3 is that snapshot volume 360 and primary volume 350 can reside on separate physical storage devices because the persistent data change maps are included in the same data volume as the respective data.

Each volume in the storage environment shown can be mirrored, and each can have its own persistent accumulator map and persistent volume map tracking changes with respect to other data volumes. For example, snapshot volume 360 also includes persistent accumulator map 362 to track changes made to detached mirror (snapshot) 120B. Persistent accumulator map 362 is used to track changes made to detached mirror 120B. Persistent volume map 364 is used to track changes corresponding to snapshots of detached mirror (snapshot) 120B. For example, data 110 can be considered to be a snapshot of detached mirror 120B, the two having been identical at the time detached mirror 120B was detached. Therefore, persistent volume map 364 can be used to track changes made to detached mirror 120B after mirror 120B was detached from data 110. Additional persistent volume maps (not shown) can be used to track changes made to detached mirror 120B after a snapshot of detached mirror 120B (not shown) is made.

Figure 4:
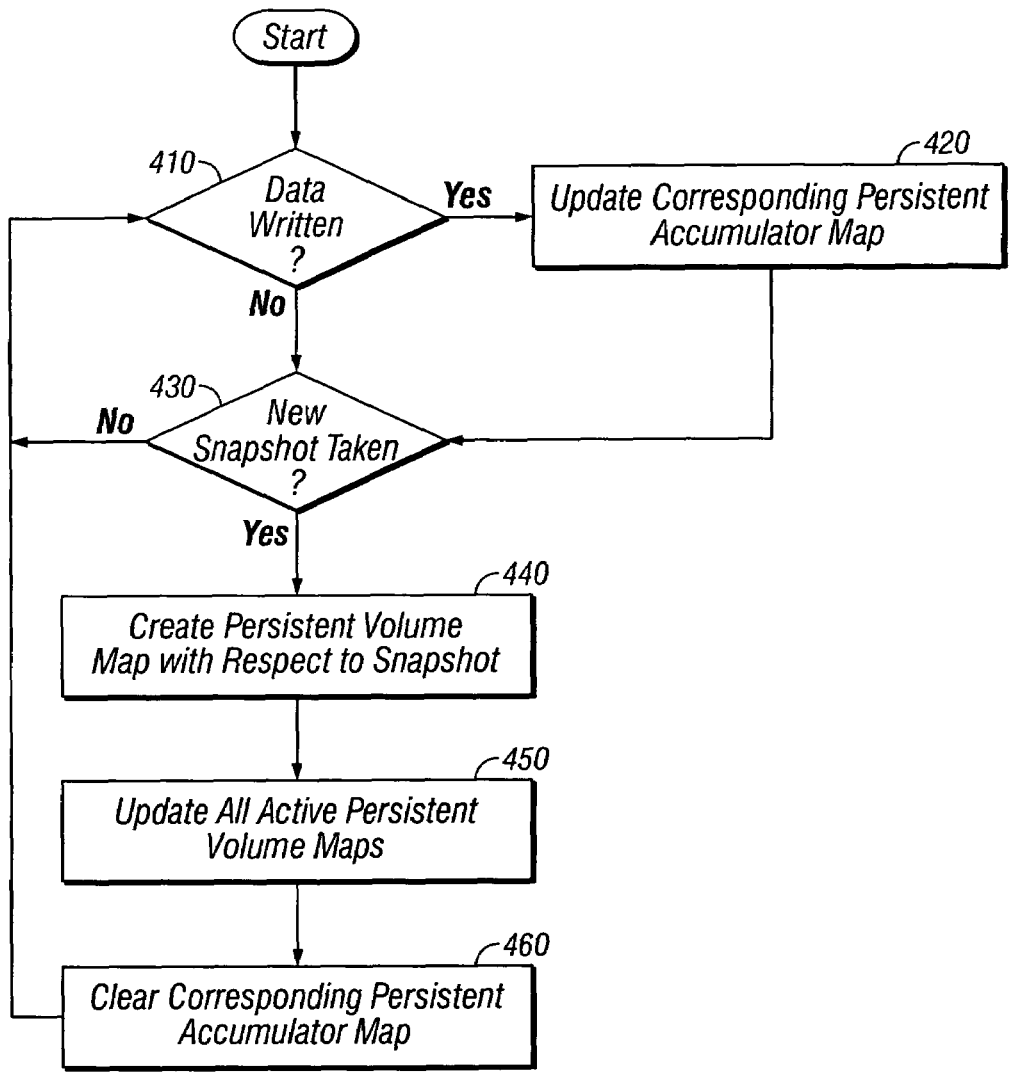
FIG. 4 is a flowchart indicating when a primary accumulator map and active volume maps on the primary volume are updated.

FIG. 4 is a flowchart describing updates to persistent accumulator maps and persistent volume maps. In Data Written decision point 410, a determination is made whether a write has been made to the data. The term 'write' is used herein to describe writing new data as well as updating existing data. If data have been written, control transitions to Update Corresponding Persistent Accumulator Map step 420, where a bit is set to have a value of logical 1 in the persistent accumulator map corresponding to the data. Control then transitions to New Snapshot Taken decision point 430, which is also reached when no data have been written at Data Written decision point 410.

In one embodiment, creation of a new snapshot volume and associated volume map occurs upon the creation of a new snapshot as well as upon detaching an existing mirror, which results in the creation of a new snapshot volume and associated volume map. If a new snapshot has been created at New Snapshot Taken decision point 430, control transitions to Create Persistent Volume Map with respect to Snapshot step 440. Control then transitions to Update All Active Persistent Volume Maps step 450, where all persistent active volume maps associated with the data are updated. Note that each persistent active volume map is not updated with every write to the data, but only upon the creation of a new snapshot. In this way, overhead involved in maintaining the persistent data change maps is limited.

From Update All Active Persistent Volume Maps step 450, control then transitions to Clear Corresponding Persistent Accumulator Map step 460. The persistent accumulator map corresponding to the data is reinitialized to have values of logical 0 for every bit. Thus, the persistent accumulator map tracks changes made to primary data between creation of snapshots. Control then returns to Data Written decision point 410 to determine whether additional data have been written.

If no snapshot has been taken at New Snapshot Taken decision point 430, control then returns to Data Written decision point 410 to determine whether additional data have been written. Activities that trigger updates of the persistent data change maps are writing data and/or taking a snapshot of the data.

Figure 5B:
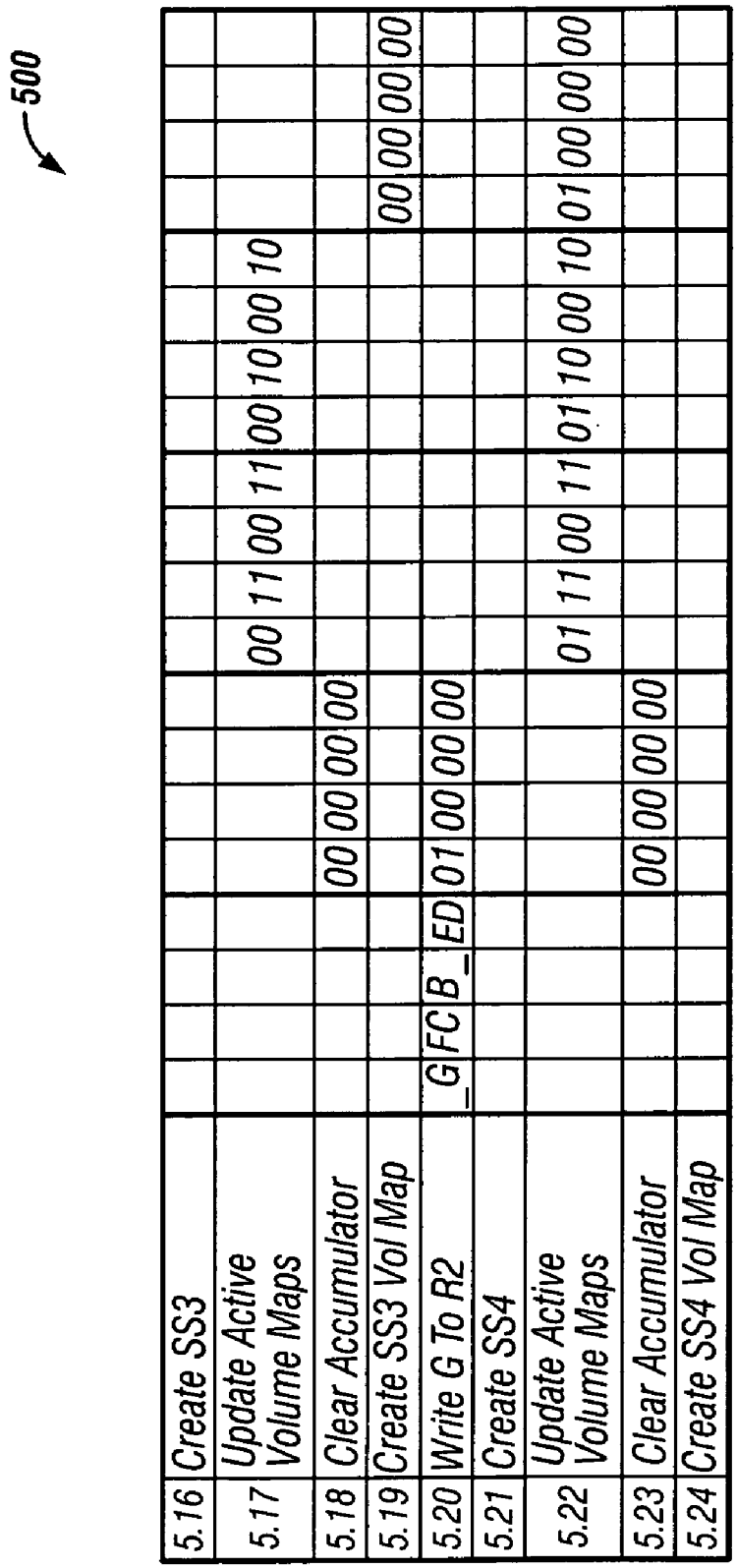

FIG. 5 illustrates the use of persistent accumulator maps and persistent volume maps in accordance with one embodiment of the present invention. FIG. 5 shows events related to primary data in a primary volume, a persistent accumulator map for tracking changes to the primary data, and three persistent volume maps for tracking data changes with respect to three snapshots of the primary data taken at different points in time.

In table 500, the column labeled Event 510 contains a series of events 5.1 through 5.24 tracking a set of changes to primary data. The contents of primary volume 520, corresponding to the primary data, are shown for each change to primary data and during the creation of three snapshots SS1, SS2 and SS3 (not shown), corresponding to SS1 Volume Map 540, SS2 Volume Map 550, and SS3 Volume Map 560.

Event 5.1 represents the establishment of primary volume 520 and the initialization of primary accumulator map 530. Data values for eight regions of primary volume 520 are shown for purposes of illustration. In event 5.2, data having a value of 'A' are written to region 2 of primary volume 520. In event 5.3, data having a value of 'B' are written to region 5 of primary volume 520. Corresponding bits are also set for regions 2 and 5 in persistent accumulator map 530. In event 5.4, a first snapshot volume including a first snapshot SS1 of the primary data and a corresponding persistent volume map are created, as represented by SS1 volume map 540.

Normally upon creation of a snapshot (in one embodiment, a snapshot volume), all active persistent volume maps are updated, as shown by event 5.5. In the point in time represented by event 5.5, no persistent volume maps have been created, and no updates are shown. In event 5.6, persistent accumulator map 530 is updated to contain values of logical 0. In event 5.7, persistent SS1 volume map 540 is created and initialized to include values of logical 0. At the point in time when the first snapshot is created, no differences exist between the primary data and the snapshot data. The fact that data have been written in events 5.2 and 5.3 is captured in snapshot SS1 (not shown), which is currently identical to the data for primary volume 520 at the point in time represented by event 5.4.

In event 5.8, data having a value of 'C' are written to region 4 of primary volume 520, and in event 5.9, data having a value of 'D' are written to region 8. Corresponding bits are also set for regions 4 and 8 in persistent accumulator map 530.

In event 5.10, a second snapshot volume including a second snapshot SS2 (not shown) of the primary data and a corresponding persistent volume map are created, as represented by SS2 volume map 550. The fact that data have been written in events 5.8 and 5.9 is captured in snapshot SS2 (not shown), which is currently identical to the data for primary volume 520 at the point in time represented by event 5.10.

In event 5.11, all active persistent volume maps are updated, including SS1 volume map 540. Updating the persistent volume maps involves performing a logical OR operation between the bits of primary accumulator map 530 and each persistent volume map to update the respective persistent volume map. After the OR operation, bits for regions 4 and 8 are set in SS1 volume map 540 due to the changes made to primary data in events 5.8 and 5.9 after the creation of the first snapshot volume.

In event 5.12, persistent accumulator map 530 is cleared to contain values of logical zeroes, as all changes made to the primary data since creation of the first snapshot are recorded in SS1 volume map 540. Tracking begins for all changes to primary data of primary volume 520 since the creation of the second snapshot. In event 5.13, persistent volume map 550 is created for snapshot volume SS2 and initialized to contain logical zeroes. In action 5.14, data having a value of 'E' are written to region 7 of primary volume 520, and in action 5.15, data having a value of 'F' are written to region 3 of primary volume 520. Corresponding bits are also set for regions 7 and 3 in persistent accumulator map 530.

In event 5.16, a third snapshot volume including a third snapshot SS3 (not shown) of the primary data and a corresponding persistent volume map are created, as represented by persistent SS3 volume map 560. The fact that data have been written in events 5.14 and 5.15 is captured in snapshot SS3 (not shown), which is currently identical to the data for primary volume 520 at the point in time represented by event 5.16.

In event 5.17, all active persistent volume maps are updated, including persistent SS1 volume map 540 and persistent SS2 volume map 550. Updating the persistent volume maps involves performing a logical OR operation between the bits of primary accumulator map 530 and each persistent volume map to update the respective persistent volume map. After the OR operation, bits for regions 3 and 7 are updated in both persistent SS1 volume map 540 and persistent SS2 volume map 550. Persistent SS1 volume map 540 indicates that changes have been made to regions 3, 4, 7 and 8 since the creation of the first snapshot volume. Persistent SS2 volume map 550 indicates that changes have been made to regions 3 and 7 since the creation of the second snapshot volume.

In event 5.18, persistent accumulator map 530 is cleared to contain values of logical zeroes, as all changes made to the primary data since creation of the first snapshot are recorded in persistent SS1 volume map 540 and all changes made to the primary data since creation of the second snapshot are recorded in persistent SS2 volume map 550. Tracking begins for all changes to primary data since the creation of the third snapshot. In event 5.19, persistent snapshot SS3 volume map 560 is created for the third snapshot volume and initialized to contain logical zeroes. In action 5.20, data having a value of 'G' are written to region 2 of primary volume 520, overwriting the data having a value of 'A.' A corresponding bit for region 2 is set in persistent accumulator map 530.

In event 5.22, a fourth snapshot volume including a fourth snapshot of the primary data and a corresponding persistent volume map (not shown) are created. In event 5.23, all active persistent volume maps are updated, including persistent SS1 volume map 540, persistent SS2 volume map 550, and persistent SS3 volume map 560. Updating the persistent volume maps involves performing a logical OR operation between the bits of primary accumulator map 530 and each persistent volume map to update the respective persistent volume map. After the OR operation, bits for region 2 are updated in all three example persistent volume maps 540, 550 and 560.

Persistent SS1 volume map 540 indicates that changes have been made to regions 2, 3, 4, 7 and 8 since the creation of the first snapshot volume. To synchronize the first snapshot with the primary data, data for regions 2, 3, 4, 7 and 8 are copied from the primary data to the first snapshot. Persistent SS2 volume map 550 indicates that changes have been made to regions 2, 3 and 7 since the creation of the second snapshot volume. To synchronize the second snapshot with the primary data, data for regions 2, 3, 4, 7 and 8 are copied from the primary data to the second snapshot. Persistent SS3 volume map 560 indicates that changes have been made to region 2 since the creation of the second snapshot volume. Only data from region 2 must be copied to the third snapshot to synchronize the third snapshot with the primary data.

FIGS. 6A, 6B and 6C illustrate the use of symmetrical data change tracking with respect to a set of data and a copy of the set of data, referred to herein as a snapshot or a second set of data, in accordance with one embodiment of the present invention. The data and the copy may be independently updated after the two sides are "split." A join may be performed of the two sides of the split to synchronize the data.

For the first set of data, an accumulator map tracks changes to the first set of data and a volume map tracks changes to the first set of data with respect to a second set of data. For the second set of data (the snapshot), a second accumulator map tracks changes to the second set of data and a second volume map tracks changes to the second set of data with respect to the first set of data. For symmetrical change tracking, the data change maps are not required to be stored persistently; however, data change maps are preferably stored persistently to avoid the problems described above with regard to hardware and software failures.

In table 600 of FIG. 6A, the column labeled Event 610 contains a series of events 6.1 through 6.16 tracking a set of changes to data on two volumes, volume 620, also referred to as volume 1, and volume 650, also referred to as volume 2 or as a snapshot of volume 1. The contents of volume 620, corresponding to the first set of data, are shown for each change to the first set of data, during the creation of a first snapshot Volume 2 650, and during the creation of a second snapshot of the first set of data (not shown). Similarly, the contents of Volume 650, corresponding to the second set of data (i.e., the first snapshot of the first set of data), are shown for each change to the first snapshot and during the creation of a second-generation snapshot (not shown) that is a copy of the first snapshot.

Event 6.1 represents the establishment of volume 620 (volume 1) and the initialization of a primary accumulator map 630 to track changes to volume 1. Data values for eight regions of each of volumes 620 and 650 (volumes 1 and 2) are shown for purposes of illustration. In event 6.2, data having a value of 'A' are written to region 2 of volume 620 (volume 1). In event 6.3, data having a value of 'B' are written to region 5 of volume 620 (volume 1). Corresponding bits are also set for regions 2 and 5 in an accumulator map 630 corresponding to volume 1. In event 6.4, a first snapshot volume, volume 650 (volume 2) including a first snapshot of the data and a corresponding volume map 670 (tracking changes with respect to volume 2) are created. At the point in time represented by event 6.4, not only is volume 2 a snapshot of volume 1, but volume 1 can be considered a snapshot of volume 2.

Normally upon creation of a snapshot (in one embodiment, a snapshot volume), all active volume maps on the volume of which the snapshot was taken are updated, as shown by event 6.5. At the point in time represented by event 6.5, no volume maps have been created for volume 1, and no updates are shown. In event 6.6, accumulator map 630 (for volume 1) is updated to contain values of logical 0. In event 6.7, volume map 640 is created and initialized to include values of logical 0. Volume map 640 is used to track changes to data for volume 620 (volume 1) with respect to volume 650 (volume 2). A symmetrical volume map 670 is created for volume 650 (volume 2) with respect to volume 620 (volume 1). Volume map 670 is also initialized to include values of logical 0.

At the point in time when volume 650 (volume 2) is created, no differences exist between the data on volume 620 (volume 1) and the snapshot data on volume 650 (volume 2). The fact that data have been written in events 6.2 and 6.3, prior to the creation of a snapshot, is captured in volume 2, which is currently identical to the data for volume 620 (volume 1) at the point in time represented by event 6.4.

In event 6.8, data having a value of 'C' are written to region 4 of volume 650 (volume 2), and in event 6.9, data having a value of 'D' are written to region 8 of volume 650 (volume 2). Corresponding bits are also set for regions 4 and 8 in accumulator map 660 corresponding to volume 650 (volume 2).

In event 6.10, a second-generation snapshot of the data (not shown) is taken when a snapshot is taken of volume 2 is taken. The fact that data have been written in events 6.8 and 6.9 is captured in the new second-generation snapshot (not shown), which is currently identical to the data for volume 650 (volume 2) at the point in time represented by event 6.10.

In event 6.11, all active volume maps for volume 650 (volume 2) are updated, including volume map 670, which tracks changes made to data on volume 650 (volume 2) with respect to volume 620 (volume 1). Updating the volume maps on volume 650 (volume 2) involves performing a logical OR operation between the bits of accumulator map 660 for volume 2 and each volume map on volume 2 to update the respective volume map. After the logical OR operation, bits for regions 4 and 8 are set in volume map 670 due to the changes made to snapshot data in events 6.8 and 6.9 after the creation of the symmetrical snapshot volume (volume 620 (volume 1)) in event 6.4.

In event 6.12, accumulator map 670 for volume 2 is cleared to contain values of logical zeroes, as all changes made to the snapshot data since creation of the first snapshot (volume 620 (volume 1) are recorded in volume map 670. A new volume map (not shown) is created on volume 650 for tracking changes to volume 650 (volume 2) with respect to the new second-generation snapshot (not shown). Tracking begins in the new volume map (not shown) for all changes to snapshot data of volume 650 since the creation of the second-generation snapshot in event 6.10.

In event 6.13, data having a value of 'E' are written to region 7 of volume 620 (volume 1) and a corresponding bit is also set for region 7 in accumulator map 630 for volume 620 (volume 1). In action 6.14, another snapshot (not shown) is taken of the data of volume 620. The fact that data have been written to volume 620 (volume 1) in event 6.13 is captured in the new snapshot, which is currently identical to the data for volume 620 (volume 1) at the point in time represented by event 6.14.

In event 6.15, all active volume maps on volume 620 (volume 1) are updated, including volume map 640 tracking changes to volume 620 (volume 1) with respect to volume 650 (volume 2). Updating the volume maps involves performing a logical OR operation between the bits of accumulator map 630 and each volume map to update the respective volume map. After the OR operation, a bit for region 7 is updated.

In event 6.16, accumulator map 630 is cleared to contain values of logical zeroes, as all changes made to the data on volume 620 (volume 1) since creation of the first snapshot are recorded in volume map 640.

At the point in time after event 6.16, volume map 640 indicates that changes have been made to region 7 of volume 620 (volume 1) with respect to volume 650 (volume 2) since the creation of the first symmetrical snapshot volumes.

FIG. 6B shows the effect of event 6.17, synchronizing volume 650 (volume 2) to volume 620 (volume 1) to bring the snapshot up to date with the current state of the data. The result of a synchronization of the original snapshot to the original data will be that volume 650 (volume 2) is identical to the data on volume 620 (volume 1). To avoid copying all regions of volume 620 (volume 1), the four data change maps described above are used, including accumulator map 630, volume map 640, accumulator map 660, and volume map 670. A logical OR operation is performed on values for each region in the four data change maps to identify whether the data on the volume to be updated, here volume 650 (volume 2), are changed. The result of the logical OR operation is shown in combined map 680, having values of 00010011.

A null value is represented herein as a dash character, '-'. As shown at the point in time represented by event 6.16, before the synchronization, volume 620 (volume 1) has data with values of -A - - B - E -, and volume 650 (volume 2) has data with values of - A - C B - - D. Combined map 680, having values of 00010011, indicates that the values for region 4, 7 and 8 are to be copied from volume 1 to volume 2. The following values are copied from volume 620 (volume 1) during synchronization: a null value for region 4, a value of 'E' for region 7, and a null value for region 8. This synchronization operation produces data on volume 650 (volume 2) having values of -A - - B - E -, identical to the data on volume 620 (volume 1). In effect, the changes made to the original data since creation of the symmetrical snapshot are retained, and the changes made to the snapshot are "backed out."

FIG. 6C shows the effect of an alternative event 6.17, synchronizing volume 620 (volume 1) to volume 650 (volume 2) to restore the data to a previous version. The result of a synchronization of the original data to the snapshot will be that volume 620 (volume 1) is identical to the data on volume 650 (volume 2). As described above, to avoid copying all regions of volume 650 (volume 2), the four data change maps described above are used, including accumulator map 630, volume map 640, accumulator map 660, and volume map 670. A logical OR operation is performed on values for each region in the four data change maps to identify whether the data on the volume to be updated, here volume 620 (volume 1), are changed. The result of the logical OR operation is shown again in combined map 680.

As shown at the point in time represented by event 6.16, before the synchronization, volume 650 (volume 2) has data with values of - A - C B - - D, and volume 620 (volume 1) has data with values of - A - - B - E -. The result of the logical OR operation has values of 00010011, indicating that the values for region 4, 7 and 8 are to be copied from volume 2 to volume 1. The following values are copied from volume 650 (volume 2) during synchronization: a value of 'C' for region 4, a null value for region 7, and value of 'D' for region 8. This synchronization operation produces data on volume 650 (volume 2) having values of - A - C B - - D, identical to the data on volume 620 (volume 1). In effect, the changes to the snapshot made since creation of the symmetrical snapshots are applied to the original data, thereby "backing out" the changes made to the original data.

An Example Computing and Network Environment

Figure 7:
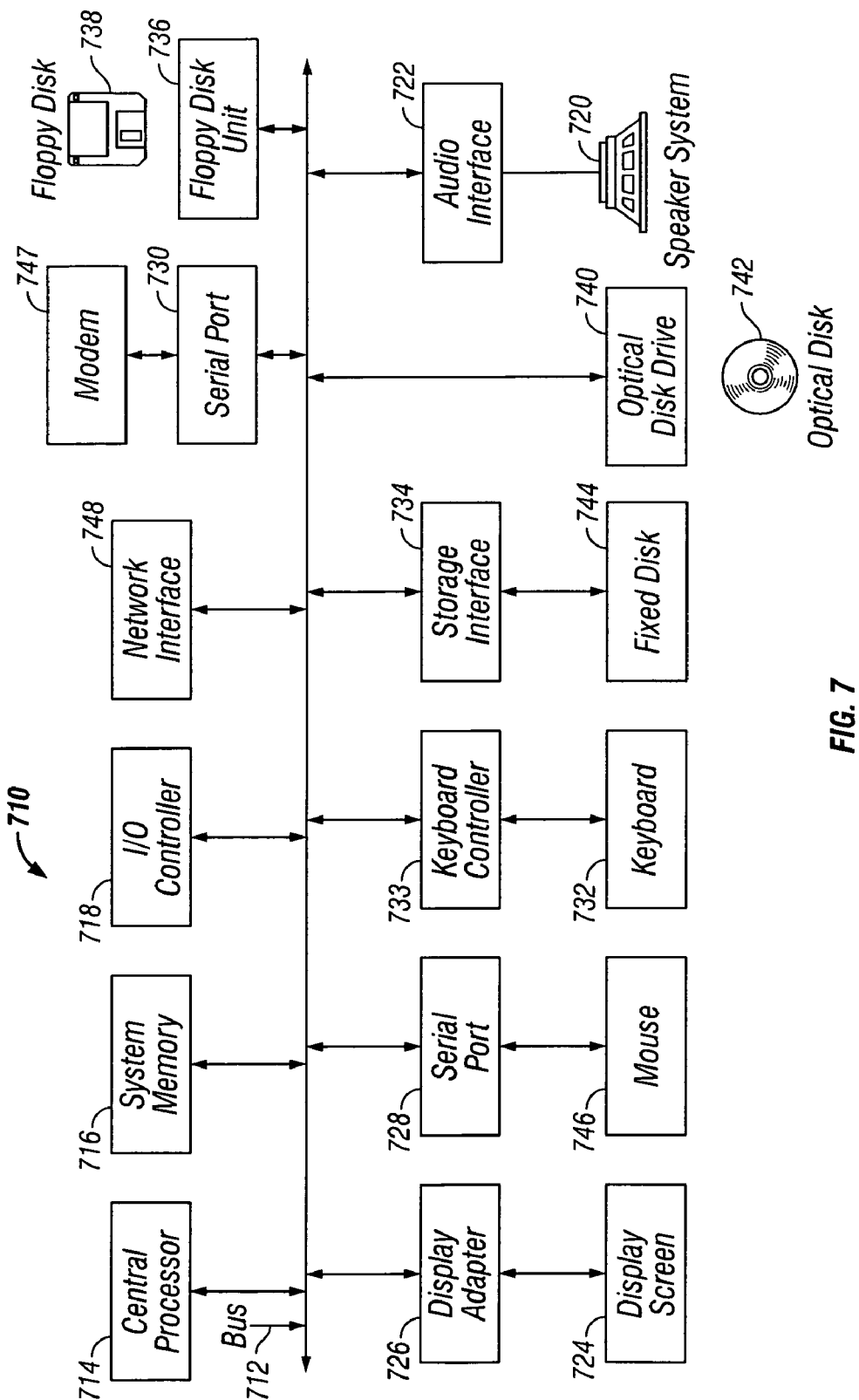
FIG. 7 is a block diagram illustrating a computer system suitable for implementing embodiments of the present invention.

FIG. 7 depicts a block diagram of a computer system 710 suitable for implementing the present invention. Computer system 710 includes a bus 712 which interconnects major subsystems of computer system 710 such as a central processor 714, a system memory 716 (typically RAM, but which may also include ROM, flash RAM, or the like), an input/output controller 718, an external audio device such as a speaker system 720 via an audio output interface 722, an external device such as a display screen 724 via display adapter 726, serial ports 728 and 730, a keyboard 732 (interfaced with a keyboard controller 733), a storage interface 734, a floppy disk drive 736 operative to receive a floppy disk 738, and a CD-ROM drive 740 operative to receive a CD-ROM 742. Also included are a mouse 746 (or other point-and-click device, coupled to bus 712 via serial port 728), a modem 747 (coupled to bus 712 via serial port 730) and a network interface 748 (coupled directly to bus 712).

Bus 712 allows data communication between central processor 714 and system memory 716, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., CD-ROM drive 740), floppy disk unit 736 or other storage medium. Additionally, applications may be in the form of electronic signals modulated in accordance with the application and data communication technology when accessed via network modem 747 or interface 748.

Storage interface 734, as with the other storage interfaces of computer system 710, may connect to a standard computer readable medium for storage and/or retrieval of information, such as a fixed disk drive 745. Fixed disk drive 744 may be a part of computer system 710 or may be separate and accessed through other interface systems. Many other devices can be connected such as a mouse 746 connected to bus 712 via serial port 728, a modem 747 connected to bus 712 via serial port 730 and a network interface 748 connected directly to bus 712. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 716, fixed disk 744, CD-ROM 742, or floppy disk 738. Additionally, computer system 710 may be any kind of computing device, and so includes personal data assistants (PDAs), network appliance, X-window terminal or other such computing device. The operating system provided on computer system 710 may be MS-DOS®, MS-WINDOWS®, OS/2®, UNIX®, Linux® or other known operating system. Computer system 710 also supports a number of Internet access tools, including, for example, an HTTP-compliant web browser having a JavaScript interpreter, such as Netscape Navigator® 8.0, Microsoft Explorer® 8.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 710). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 8:
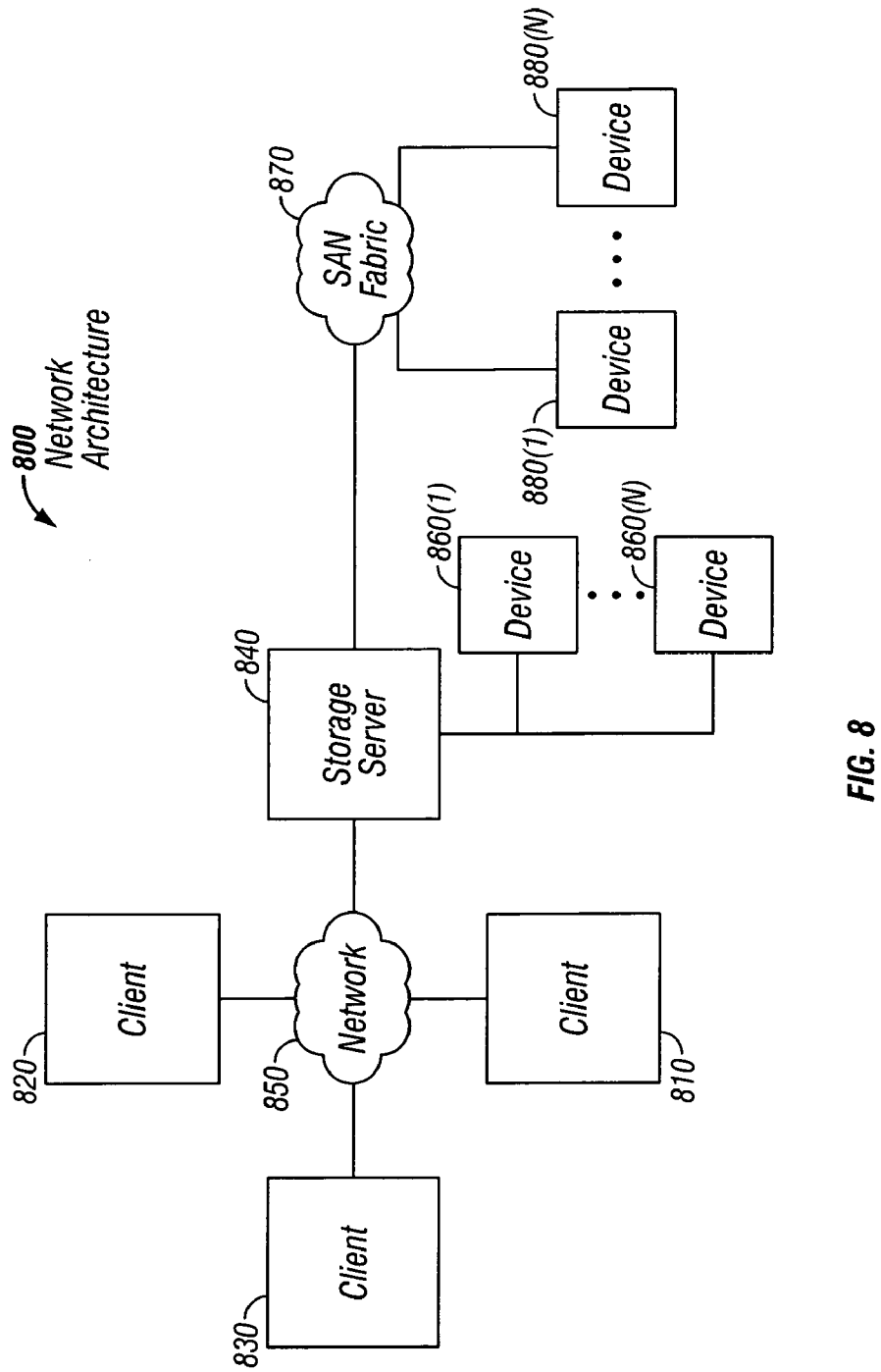
FIG. 8 is a block diagram illustrating a network environment in persistent data change maps according to embodiments of the present invention may be used.

FIG. 8 is a block diagram depicting a network architecture 800 in which client systems 810, 820 and 830, as well as a storage server 840 (any of which can be implemented using computer system 810), are coupled to a network 850. Storage server 840 is further depicted as having storage devices 860(1)–(N) directly attached thereto. Storage server 840 is also connected to a SAN fabric 870, although connection to a storage area network is not required for operation of the invention. SAN fabric 870 supports access to storage devices 880(1)–(N) by storage server 840, and so by client systems 810, 820 and 830 via network 850.

With reference to computer system 710, modem 747, network interface 748 or some other method can be used to provide connectivity from computer system 710 to network 850. Client systems 810, 820 and 830 are able to access information on storage server 840 using, for example, a web browser or other client software (not shown). Such a client allows client systems 810, 820 and 830 to access data hosted by storage server 840 or one of storage devices 860(1)–(N) or 880(1)–(N). FIG. 8 depicts the use of a network such as the Internet for exchanging data, but the present invention is not limited to the Internet or any particular network-based environment.

Advantages of the present invention are many. The ability to synchronize only a subset of the snapshot data and primary data greatly speeds the process of synchronization and restoration. Furthermore, since each write to primary data involves only a single write to one accumulator map, little overhead is necessary to achieve significant gains in performance. Minimal storage space is used to store the respective data change maps, and a minimum number of updates to the data change maps are made to synchronize data with a snapshot, thereby enhancing the efficiency without sacrificing performance of the applications maintaining the data.

The present invention provides flexibility in configuration of storage environments by allowing multiple configurations of snapshots and backup copies. For example, the present invention can be used for a relatively unlimited number of backups, rather than being restricted to storing the backups on the same physical storage devices as the data of which the backups are made. Because snapshots of data can be moved to secondary, even remote, physical storage devices, configuration of the storage environment becomes much more flexible than previously possible. In addition, snapshots of data can be mirrored for protection of highly critical data.

Furthermore, the present invention can be used in a clustering environment. Clustering is a strategy wherein computer systems (referred to as nodes) and storage devices are interconnected, typically at high speeds within a local data center, for the purpose of improving reliability, availability, serviceability, and/or performance via load balancing. Redundant interconnections between the computer systems are typically included as well, and the collection of computer systems, storage devices, and redundant interconnections is referred to herein as a cluster. The cluster appears to users as a single highly available system.

Portions of a set of data can be maintained by different nodes in a cluster. In such an environment, data change maps can be maintained for each node with respect to the changes to the portions of the set of data made by that respective node. A logical OR operation can be performed on the data change maps for all nodes in order to track changes made to the commonly-maintained set of data. References to a data change map, such as an accumulator map or a volume map, are used herein to include the possibility that multiple data change maps are combined to perform the functionality of a single data change map described herein.

The invention can also be used to track changes to data with respect to other points in time. In one embodiment, a logical input/output error on a storage device may result in detachment of a mirror, rather than a detachment made under control of backup management software. In such an embodiment, separate data change maps can be maintained with respect to the point in time when the mirror was detached and used in conjunction with the data change maps for snapshots created as described herein.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
    maintaining a first accumulator map for a first set of data, wherein
       the first accumulator map tracks changes in the first set of data;
    maintaining a first volume map for the first set of data, wherein the first volume map tracks changes in the first set of data with respect to a version of a second set of data;
    maintaining a second volume map for the second set of data, wherein
       the second volume map tracks changes in the second set of data with respect to a version of the first set of data; and
    using the first accumulator map to update the first volume map when a copy of the first set of data is made.

2. The method of claim 1 wherein
the second set of data is created as a snapshot of the first set of data.

3. The method of claim 2 wherein
each of the first set of data and the second set of data can be updated independently after the second set of data is created.

4. The method of claim 1 further comprising:
synchronizing a portion of the first set of data with a corresponding portion of the second set of data such that the first set of data and the second set of data are the same.

5. The method of claim 4 further comprising:
identifying the portion and the corresponding portion using:
    the first volume map;
    the first accumulator map, wherein
       the first accumulator map tracks changes in the first set of data after a first point in time;
    the second volume map; and
    a second accumulator map, wherein
       the second accumulator map tracks changes in the second set of data after a second point in time.

6. The method of claim 1 further comprising:
storing at least one of the first accumulator map, the first volume map, and the second volume map persistently.

7. The method of claim 1 further comprising:
storing the first set of data and the first volume map on a first storage device; and
storing the second set of data and the second volume map on a second storage device.

8. The method of claim 7 comprising:
storing the first accumulator map on the first storage device, wherein
    the first accumulator map tracks changes in the first set of data after a first point in time; and
storing a second accumulator map on the second storage device, wherein
    the second accumulator map tracks changes in the second set of data after a second point in time.

9. The method of claim 1 further comprising:
clearing the first accumulator map after the first volume map is updated.

10. A system comprising:
first maintaining means for maintaining a first volume map for a first set of data, wherein the first volume map tracks changes in the first set of data with respect to a version of a second set of data; and
second maintaining means for maintaining a second volume map for the second set of data, wherein
    the second volume map tracks changes in the second set of data with respect to a version of the first set of data; and
third maintaining means for maintaining a first accumulator map for the first set of data, wherein the first accumulator map tracks changes in the first set of data; and using means for using the first accumulator map to update the first volume map when a copy of the first set of data is made.

11. The system of claim 10 wherein the second set of data is created as a snapshot of the first set of data.

12. The system of claim 11 wherein each of the first set of data and the second set of data can be updated independently after the second set of data is created.

13. The system of claim 10 further comprising:

synchronizing means for synchronizing a portion of the first set of data with a corresponding portion of the second set of data such that the first set of data and the second set of data are the same.

14. The system of claim 10 further comprising:

clearing means for clearing the first accumulator map after the first volume map is updated.

15. A system comprising:

a first maintaining module to maintain a first volume map for a first set of data, wherein the first volume map tracks changes in the first set of data with respect to a version of a second set of data;

a second maintaining module to maintain a second volume map for the second set of data, wherein
the second volume map tracks changes in the second set of data with respect to a version of the first set of data;

a third maintaining module to maintain a first accumulator map for the first set of data, wherein the first accumulator map tracks changes in the first set of data; and a using module configured to use the first accumulator map to update the first volume map when a copy of the first set of data is made.

16. The system of claim 15 wherein the second set of data is created as a snapshot of the first set of data.

17. The system of claim 16 wherein each of the first set of data and the second set of data can be updated independently after the second set of data is created.

18. The system of claim 15 further comprising:

a synchronizing module to synchronize a portion of the first set of data with a corresponding portion of the second set of data such that the first set of data and the second set of data are the same.

19. The system of claim 15 further comprising:

a clearing module configured to clear the first accumulator map after the first volume map is updated.

20. A computer system comprising:

a processor for executing at least one instruction;

a memory coupled to the processor, the memory comprising:

first maintaining instructions to maintain a first volume map for a first set of data, wherein the first volume map tracks changes in the first set of data with respect to a version of a second set of data;

second maintaining instructions to maintain a second volume map for the second set of data, wherein
the second volume map tracks changes in the second set of data with respect to a version of the first set of data;

third maintaining instructions to maintain a first accumulator map for the first set of data, wherein
the first accumulator map tracks changes in the first set of data; and using instructions configured to use the first accumulator map to update the first volume map when a copy of the first set of data is made.

21. The computer system of claim 20 wherein the second set of data is created as a snapshot of the first set of data.

22. The computer system of claim 21 wherein each of the first set of data and the second set of data can be updated independently after the second set of data is created.

23. The computer system of claim 20 wherein the memory further comprises:

synchronizing instructions to synchronize a portion of the first set of data with a corresponding portion of the second set of data such that the first set of data and the second set of data are the same.

24. The computer system of claim 20 further comprising:

clearing instructions configured to clear the first accumulator map after the first volume map is updated.

25. A computer program product contained on a computer-readable medium, wherein the computer program product comprises:

first maintaining instructions to maintain a first volume map for a first set of data, wherein the first volume map tracks changes in the first set of data with respect to a version of a second set of data;

second maintaining instructions to maintain a second volume map for the second set of data, wherein
the second volume map tracks changes in the second set of data with respect to a version of the first set of data;

third maintaining instructions to maintain a first accumulator map for the first set of data, wherein
the first accumulator map tracks changes in the first set of data; and using instructions configured to use the first accumulator map to update the first volume map when a copy of the first set of data is made.

26. The computer program product of claim 25 wherein the second set of data is created as a snapshot of the first set of data.

27. The computer program product of claim 26 wherein each of the first set of data and the second set of data can be updated independently after the second set of data is created.

28. The computer program product of claim 25 further comprising:

synchronizing instructions to synchronize a portion of the first set of data with a corresponding portion of the second set of data such that the first set of data and the second set of data are the same, wherein
the computer-readable medium further stores the synchronizing instructions.

29. The computer program product of claim 25 further comprising:

clearing instructions configured to clear the first accumulator map after the first volume map is updated.

* * * * *